United States Patent
Dokor et al.

(10) Patent No.: US 9,092,394 B2
(45) Date of Patent: Jul. 28, 2015

(54) DEPTH BASED CONTEXT IDENTIFICATION

(75) Inventors: Tarek El Dokor, Phoenix, AZ (US); James Holmes, Mesa, AZ (US); Jordan Cluster, Tempe, AZ (US); Stuart Yamamoto, Hacienda Heights, CA (US); Pedram Vaghefinazari, Long Beach, CA (US)

(73) Assignee: Honda Motor Co., Ltd., Tokyo (JP)

( * ) Notice: Subject to any disclaimer, the term of this patent is extended or adjusted under 35 U.S.C. 154(b) by 217 days.

(21) Appl. No.: 13/524,351

(22) Filed: Jun. 15, 2012

(65) Prior Publication Data

US 2013/0339027 A1    Dec. 19, 2013

(51) Int. Cl.
*G10L 21/00* (2013.01)
*G10L 15/00* (2013.01)
*G06F 17/20* (2006.01)
*G06F 3/01* (2006.01)
*G10L 15/24* (2013.01)
*G10L 15/25* (2013.01)
*G09G 5/08* (2006.01)

(52) U.S. Cl.
CPC .............. *G06F 17/20* (2013.01); *G06F 3/017* (2013.01); *G09G 5/08* (2013.01); *G10L 15/24* (2013.01); *G10L 15/25* (2013.01); *G06F 2203/0381* (2013.01)

(58) Field of Classification Search
CPC ... G10L 15/24; G10L 15/25; G10L 2015/226; G06F 3/017; G06F 2203/0381
USPC .................................. 704/231–257, 270–278
See application file for complete search history.

(56) References Cited

U.S. PATENT DOCUMENTS

| | | | |
|---|---|---|---|
| 5,600,765 A | 2/1997 | Ando et al. | |
| 6,243,683 B1 | 6/2001 | Peters | |
| 6,624,833 B1 | 9/2003 | Kumar et al. | |
| 6,804,396 B2 | 10/2004 | Higaki et al. | |
| 7,295,904 B2 * | 11/2007 | Kanevsky et al. | 701/36 |
| 7,665,041 B2 | 2/2010 | Wilson et al. | |
| 8,296,151 B2 * | 10/2012 | Klein et al. | 704/275 |
| 2004/0030560 A1 * | 2/2004 | Takami et al. | 704/275 |
| 2004/0141634 A1 * | 7/2004 | Yamamoto et al. | 382/104 |
| 2004/0193413 A1 * | 9/2004 | Wilson et al. | 704/243 |
| 2005/0134117 A1 * | 6/2005 | Ito et al. | 307/10.1 |

(Continued)

FOREIGN PATENT DOCUMENTS

EP    2 219 097 A1    8/2010

OTHER PUBLICATIONS

Chung, C., et al., "Gestural Interaction With In-Vehicle Audio and Climate Controls," Proceedings of the Human Factors and Ergonomics Society Annual Meeting, vol. 54, No. 19, pp. 1406-1410, Sep. 2010.

(Continued)

*Primary Examiner* — Samuel G Neway
(74) *Attorney, Agent, or Firm* — Fenwick & West LLP (57) ABSTRACT

A method or system for selecting or pruning applicable verbal commands associated with speech recognition based on a user's motions detected from a depth camera. Depending on the depth of the user's hand or arm, the context of the verbal command is determined and verbal commands corresponding to the determined context are selected. Speech recognition is then performed on an audio signal using the selected verbal commands. By using an appropriate set of verbal commands, the accuracy of the speech recognition is increased.

18 Claims, 4 Drawing Sheets

(56) References Cited

U.S. PATENT DOCUMENTS

| | | |
|---|---|---|
| 2007/0057781 A1 | 3/2007 | Breed |
| 2009/0150160 A1 | 6/2009 | Mozer |
| 2009/0278915 A1 | 11/2009 | Kramer et al. |
| 2009/0318777 A1 | 12/2009 | Kameyama |
| 2011/0022393 A1* | 1/2011 | Waller et al. .............. 704/270 |
| 2011/0035666 A1 | 2/2011 | Geisner et al. |
| 2011/0115702 A1* | 5/2011 | Seaberg .............. 345/156 |
| 2012/0075184 A1* | 3/2012 | Madhvanath .............. 345/161 |
| 2012/0105613 A1 | 5/2012 | Weng et al. |
| 2013/0307771 A1* | 11/2013 | Parker et al. .............. 345/158 |

OTHER PUBLICATIONS

Gizmag Team, "Honda to show auto navigation and multimedia system with gesture recognition," 1 page, Jan. 13, 2010, [online][retrieved on Oct. 24, 2012] Retrieved from the internet <http://www.gizmag.com/honda-to-show-auto-navigation-and-multimedia-system-with-gesture-recognition/13867/pciture/108837/>.

Müller, C., et al. "Multimodal Input in the Car, Today and Tomorrow," IEEE MultiMedia, vol. 18, No. 1, pp. 98-103, Jan. 2011.

Ortega, A., et al., "AV@CAR: A Spanish Multichannel Multimodal Corpus for In-Vehicle Automatic Audio-Visual Speech Recognition," Proceedings of the Fourth International Conference on Language Resources and Evaluation, pp. 763-766, May 26-28, 2004, Lisbon, Portugal.

Pickering, C.A., "The Search for a Safer Driver Interface: a Review of Gesture Recognition Human Machine Interface," IEEE Computing & Control Engineering Journal, vol. 16, No. 1, pp. 34-40, 2005.

Reissner, U., "Gestures and Speech in Cars," 2007, pp. 1-12, can be retrieved at <http://www14.informatik.tu-muenchen.de/konferenzen/Jass07/courses/3/3_Gestures-and-Speech-in-Cars_Report.pdf>.

PCT International Search Report and Written Opinion, PCT Application No. PCT/US2013/036654, Aug. 22, 2013, nine pages.

* cited by examiner

DEPTH BASED CONTEXT IDENTIFICATION

FIELD OF THE INVENTION

The present invention is related to recognizing voice commands using pose or gesture information to increase the accuracy of speech recognition.

BACKGROUND OF THE INVENTION

A driver or a passenger of a vehicle typically operates various devices in the vehicle using switches, screens, keypads or other input mechanism using fingers or hands. Such input mechanisms may be used to operate, for example, a navigation system, an entertainment system, a climate system or a phone system. Sometimes, a complicated series of operations must be performed on the input mechanism to issue a desired command to the devices. However, it is preferable for the driver to keep both hands on a steering wheel and operate these input devices by a hand intermittently for only a brief period of time. Depending on the complexity of the operations, it may take multiple attempts to operate the input devices before the driver can perform operations as desired.

Hence, it is advantageous to use a mode of operation that makes less use of a driver's hands. One mode of such operation is speech recognition. Speech recognition is the process of converting an acoustic signal to speech elements (e.g., phonemes, words and sentences). Speech recognition has found application in various areas ranging from telephony to vehicle operation. In a speech recognition system, the audio signal is collected by input devices (e.g., a microphone), converted to a digital signal, and then processed using one or more algorithms to output speech elements contained in the audio signal. Depending on the field of application, the recognized speech elements can be the final results of speech recognition or intermediate information used for further processing.

One of the issues in using voice recognition in vehicles is that similar or the same verbal commands may be used for different devices. Sharing of similar or the same verbal commands causes ambiguity in verbal commands. For example, a command such as "locate XYZ" may indicate the locating of a particular point-of-interest (POI) in the context of navigation whereas the same command may also indicate identification of a sound track in an entertainment system. If the context of the user's command is not properly identified, operations other that what are intended by the user may be carried out by the devices in the vehicle.

Unintended operations and time spent in subsequent remedial actions due to ambiguous verbal command may deteriorate user experience and cause the user to revert to manual operations.

SUMMARY OF THE INVENTION

Embodiments of the present invention provide a system or a method of recognizing verbal commands based on the pose or gesture of a user. One or more devices among a plurality of devices that are likely to be targeted by the user for an operation are selected by gesture information representing the pose or gesture of the user. A plurality of verbal commands associated with the one or more devices targeted by the user are selected based on the received gesture information. An audio signal is processed using the selected plurality of verbal commands to determine a device command for operating the one or more devices.

In one embodiment of the present invention, a depth camera is used for capturing at least one depth image. Each of the depth images covers at least a part of the user and comprises pixels representing distances from the depth camera to the at least part of the user. The at least one depth image is processed to determine the pose or gesture of the user. The gesture information is generated based on the recognized pose or gesture.

In one embodiment, the at least part of the user comprise a hand or a forearm of the user.

In one embodiment, the depth camera is installed in an overhead console in a vehicle with a field of view covering the user.

In one embodiment, the plurality of devices comprise at least a navigation system and an entertainment system in a vehicle.

In one embodiment, the gesture information indicates whether a hand or forearm of a user is located within a distance from the depth camera or beyond the distance from the depth camera. A first set of verbal commands is selected responsive to the gesture information indicating that the hand or the forearm is located within the distance. A second set of verbal commands is selected responsive to the gesture information indicating that the hand or the forearm is located beyond the distance.

In one embodiment, the first set of verbal commands is associated with performing navigation operations in a vehicle. The second set of verbal commands is associated with operating an entertainment system, a climate control system or a diagnostic system.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the present disclosure can be readily understood by considering the following detailed description in conjunction with the accompanying drawings.

DETAILED DESCRIPTION OF THE DISCLOSURE

A preferred embodiment is now described with reference to the figures where like reference numbers indicate identical or functionally similar elements.

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions could be embodied in software, firmware or hardware, and when embodied in software, could be downloaded to reside on and be operated from different platforms used by a variety of operating systems.

Embodiments also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the embodiments are not described with reference to any particular programming language. It will be appreciated that a variety of programming languages may be used to implement the teachings as described herein, and any references below to specific languages are provided for disclosure of enablement and best mode.

In addition, the language used in the specification has been principally selected for readability and instructional purposes, and may not have been selected to delineate or circumscribe the inventive subject matter. Accordingly, the disclosure is intended to be illustrative, but not limiting, of the scope, which is set forth in the following claims.

Embodiments relate to selecting or pruning applicable verbal commands associated with speech recognition based on a user's motion or gesture detected from a depth camera. Depending on the depth of the user's hand or forearm relative to the depth camera, the context of the verbal command is determined and one or more command dictionaries corresponding to the determined context are selected. Speech recognition is then performed on an audio signal using the selected command dictionaries. By using command dictionaries depending on the context, the accuracy of the speech recognition is increased.

As used herein, the term "user" includes a driver of a vehicle as well as a passenger. The user may be anyone attempting to control one or more devices in the vehicle.

As used herein, a "pose" refers to the configuration of body parts of a user. The pose may, for example, indicate relationships of a hand and a forearm of the user relative to other body parts or a reference point (e.g., a camera).

As used herein, a "gesture" refers to a series of configuration of body parts of a user that changes with progress of time. The gesture, for example, may include a series of arm and hand movement pointing to a direction.

As used herein, a "device command" refers to an instruction for operating or controlling a device. The device command may be received and interpreted by the device to perform a certain operation or a set of operations.

As used herein, a "navigation operation" refers to an operation by a user for using a computing device (e.g., an onboard telematics device) to identify, locate, choose or obtain information for driving to a destination. For example, the navigation operation may include providing user input to select an address or point of interest, and choosing an address or point of interest displayed as a result of providing the user input.

Overview of Vehicle Equipped with Verbal Command System

Figure 1A:
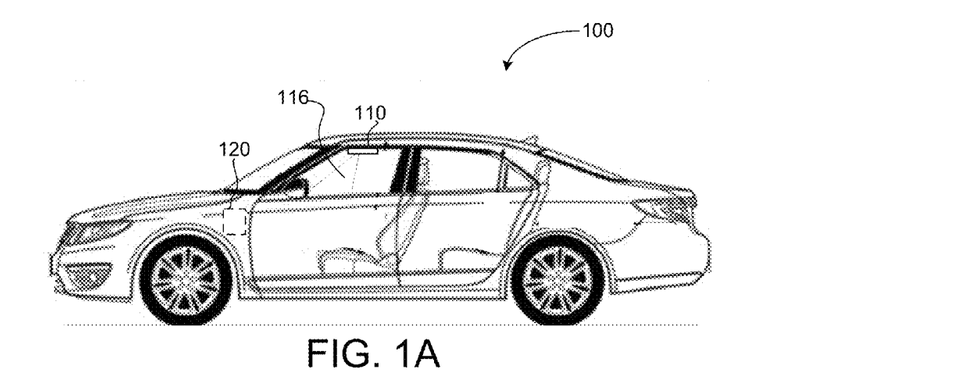
FIG. 1A is a side view of a vehicle equipped with a command processing system, according to one embodiment.
Figure 1B:
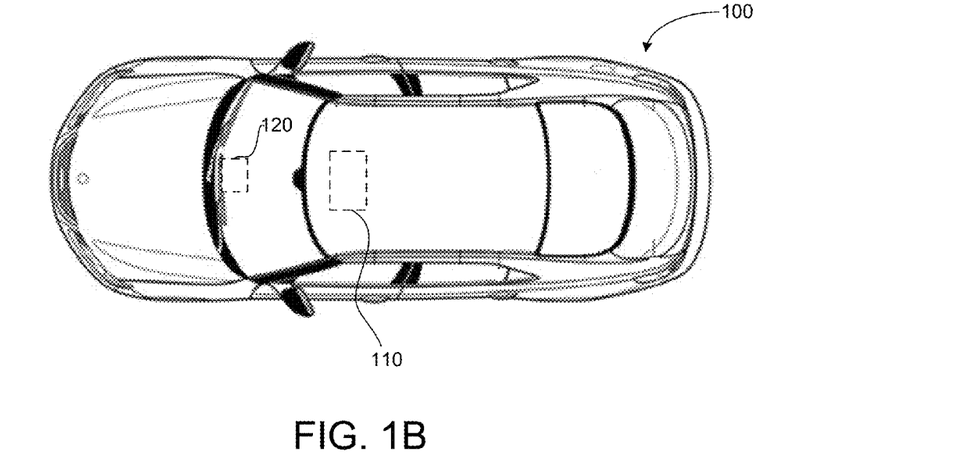
FIG. 1B is a top view of the vehicle of FIG. 1A, according to one embodiment.

FIGS. 1A and 1B illustrate a vehicle 100 equipped with a command processing system, according to one embodiment. The command processing system may include, among other components, a central processing unit 120 and an overhead console unit 110. The command processing system may be connected to other components (e.g., a navigation system and an entertainment system) of the vehicle 100 to perform various operations. The command processing system recognizes verbal commands based on a user's motion or gesture, as described below in detail with reference to FIGS. 3 and 4.

The central processing unit 120 processes an audio signal to detect a user's verbal commands included in the audio signal. The central processing unit 120 is connected to other components such as a cabin system (e.g., a navigation system, entertainment system, climate control system and diagnostic system). The central processing unit 120 controls these devices based on verbal commands received from the user. The central processing unit 120 may be a stand-alone device or may be a part of a larger system (e.g., telematics system). The central processing unit 120 is described below in detail with reference to FIG. 2.

The central processing unit 120 may be placed at any locations within the vehicle 100. As illustrated in FIGS. 1A and 1B, the central processing unit 120 may be located at the center console of the vehicle 100. Alternatively, the central processing unit 120 may be installed within the dashboard of the vehicle 100. Further, the central processing unit 120 may also be installed on the ceiling of the vehicle.

The overhead console unit 110 is located at the ceiling of the vehicle interior and includes sensors (e.g., microphone and camera) to capture depth images of the user and detect audio signals, as described below in detail with reference to FIG. 2. The overhead console unit 110 may include various other components such as a garage opener. The sensors of the overhead console unit 110 communicate with the central processing unit 120 to provide signals for detecting the user's verbal command.

The communication between the sensors of the overhead console unit 110 and the central processing unit 120 can be established by any wired or wireless communication medium currently used or to be developed in the future.

Example Command Processing System

Figure 2:
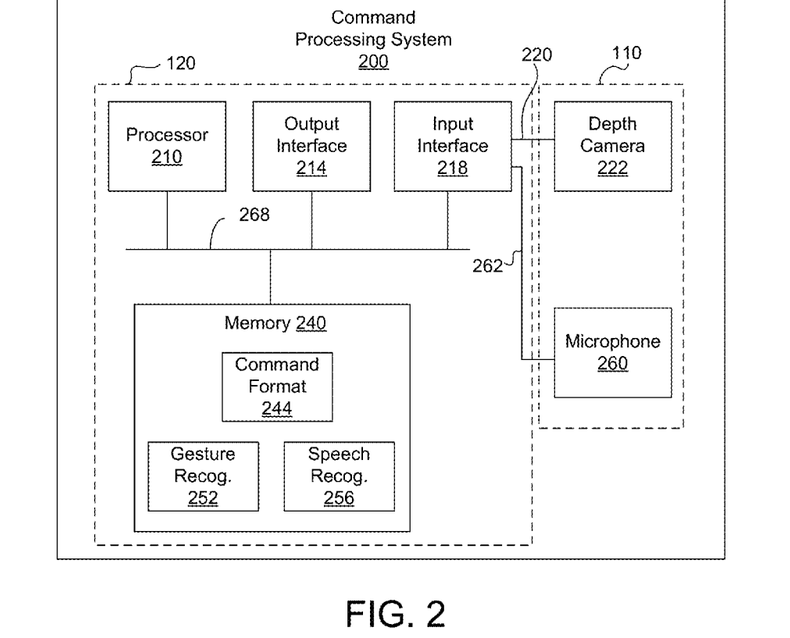
FIG. 2 is a block diagram of a command processing system, according to one embodiment.

FIG. 2 is a block diagram illustrating the command processing system 200, according to one embodiment. The command processing system 200 may include, among other components, a processor 210, an output interface 214, an input interface 218, memory 240 and a bus connecting these components. The command processing system 200 may also include a depth camera 222 and a microphone 260. The depth camera 222 and the microphone 260 are connected to the input interface 218 via channels 220, 262. Although not illustrated in FIG. 2, the command processing system 200 may include more than one depth camera or microphone.

The processor 210 executes instructions stored in the memory 240 and processes the sensor data received via the input interface 218. Although only a single processor 210 is illustrated in FIG. 2, more than one processor may be used to increase the processing capacity of the command processing system 200.

The output interface 214 is hardware, software, firmware or a combination thereof for sending data including device commands to other devices such as a navigation system, an entertainment system, a climate control system and a diagnostic system via communication channels. To send the data, the output interface 214 may format and regulate signals to comply with predetermined communication protocols.

The input interface 218 is hardware, software, firmware or a combination thereof for receiving the sensor signals from the overhead console unit 110. The sensor signals include the depth images received via channel 220, and the audio signals received via channel 262. The input interface 218 may buffer the received sensor signals and perform pre-processing on the sensor signals before forwarding the sensor signals to the processor 210 or the memory 240 via bus 268.

The depth camera 222 captures the depth images of the driver and sends the depth images to the input interface 218 via the channel 220. The depth camera 222 may be embodied as a time-of-flight (TOF) camera, a stereovision camera or other types of cameras that generate depth images including information on distance to different points of objects within its field of view. The stereovision camera uses two lenses to capture images from different locations. The captured images are then processed to generate the depth images. In one embodiment, the depth camera 222 generates grayscale images with each pixel indicating the distance from the depth camera 222 to a point of an object (e.g., the driver) corresponding to the pixel.

Referring to FIG. 1A, the depth camera 222 is installed on the overhead console unit 110 and has a field of view 116 overlooking the driver of the vehicle 100. By installing the depth camera 222 on the overhead console unit 110, the depth camera 222 advantageously has an unobstructed view of the driver and the center console of the vehicle 100. Further, the depth of the driver's hand or arm relative to the depth camera 222 provides indication of the operations intended by the driver, as described below in detail with reference to the gesture recognition module 252.

The microphone 260 senses acoustic waves and converts the acoustic waves into analog electric signals. The microphone 260 includes an analog-to-digital (A/D) converter for converting the analog electric signals into digital signals. The converted digital signals are sent to the input interface 218 via the channel 262. Alternatively, the A/D converter may be included in the input interface 218. In this case, the microphone 260 sends analog electric signals to the input interface 218 via the channel 262 for conversion to digital signals and further processing.

The memory 240 stores instructions to be executed by the processor 210 and other data associated with the instructions. The memory 240 may be volatile memory, non-volatile memory or a combination thereof. The memory 240 may store, among other software modules, a command format module 244, a gesture recognition module 252 and a speech recognition module 256. The memory 240 may include other software modules such as an operating system, the description of which is omitted herein for the sake of brevity.

The gesture recognition module 252 detects the driver's gestures or motions based on the depth images captured by the depth camera 222. In one embodiment, the gesture recognition module 252 detects the location and/or motions of the hand or forearm to determine the context of verbal commands. In one embodiment, the gesture recognition module 252 determines the location of the driver's hand or forearm relative to the depth camera 222. If the driver's hand or forearm is closer to the depth camera 222 (i.e., the distance from the depth camera 222 to the hand or forearm is below a threshold), for example, the driver is likely to be taking actions or making gestures associated with navigation operations (e.g., pointing a finger towards a direction outside the window). To the contrary, if the driver's hand or forearm is away from the depth camera 222 (i.e., the distance from the depth camera 222 to the hand or the forearm is at or above the threshold), the driver is likely to be taking actions or making gestures associated with other control functions typically provided in the center console (e.g., operate an entertainment system and climate control system).

The gesture recognition module 252 may employ a computing algorithm that clusters groups of pixels in the depth images and tracks the locations of these groups with progress of time to determine the driver's motions or gesture. The pixels may be clustered into groups based on the proximity of the two-dimensional distance of pixels and the depth difference of the pixels. The gesture recognition module 252 may also store a model of human body and map the groups of pixels to the stored model to accurately detect and track the locations of the hand and/or forearm.

In one embodiment, the gesture recognition module 252 may further detect the location of the driver's hand with a higher resolution to determine the device associated with the driver's operation. If the center console of the vehicle has switches or knobs for operating the entertainment system at the middle of the center console and switches for a climate control system at both sides, the location of the driver's hand around the middle of the center console indicates that the driver is engaged in operations of the entertainment system. If the driver's hand is closer to the sides of the center console than the middle portion of the center console, the driver is more likely to be engaged in operations of the climate control system. Hence, the command processing system 200 may use the gesture information on the specific location of the hand at the time verbal commands are issued by the driver to determine a device associated with the verbal commands.

The speech recognition module 256 determines the verbal command issued by the driver. To determine the verbal command, the speech recognition module 256 receives gesture information about the driver's gesture from the gesture recognition module 252, as described below in detail with reference to FIG. 3.

The command format module 244 translates the verbal commands detected at the speech recognition module 256 into device commands for operating devices installed in the vehicle 100. Each device installed in the vehicle 100 may require commands to be provided in a different format. Hence, the command format module 244 translates the commands into a format that can be processed by each device. Further, the command format module 244 may request further information from the driver if the issued verbal command is unclear, ambiguous or deficient. Such request for further information may be made via a speaker. The command format 244 may also combine the information from the gesture recognition module 252 to generate a device command, as described below in detail with reference to FIG. 4.

The command format module 244, the gesture recognition module 252 and the speech recognition module 256 need not be stored in the same memory 240. For example, the gesture recognition module 252 may be stored in memory in an overhead console unit whereas speech recognition module 256 and the command format module 244 may be stored in memory in a center console unit. Further, one or more of these modules may be embodied as a dedicated hardware component.

Example Architecture of Speech Recognition Module

Figure 3:
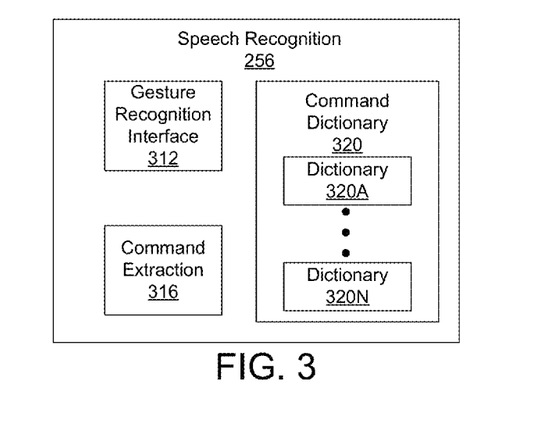
FIG. 3 is a block diagram of a speech recognition module, according to one embodiment.

FIG. 3 is a block diagram illustrating components of the speech recognition module 256, according to one embodiment. The speech recognition module 256 may include, among other components, a gesture recognition interface 312, a command extraction module 316 and a command dictionary 320. The speech recognition module 256 may also include other modules such as a history management module that retains the list of verbal commands previously issued by a user.

The gesture recognition interface 312 enables the speech recognition module 256 to communicate with the gesture recognition module 252. In one embodiment, the gesture information received from the gesture recognition module 252 via the gesture recognition interface 312 indicates the location of the driver's hand or forearm.

The command dictionary 320 includes commands associated with various devices of the vehicle 100. The command dictionary 320 includes a plurality of dictionaries 320A through 320N, each associated with a device or system of the vehicle 100. For example, dictionary 320A stores commands associated with the operation of a navigation system, dictionary 320B stores commands associated with the operation of an entertainment system, and dictionary 320C stores commands associated with a climate control system.

The command extraction module 316 extracts the verbal commands included in the audio signal based on the gesture data and commands stored in selected command dictionaries 320. After the gesture information is received, the command extraction module 316 selects one or more dictionaries based on the location of the user's hand or forearm as indicated by the gesture information. If the gesture data indicates that the user's hand or forearm is at a certain pose, dictionaries associated with devices in the vicinity of the driver's hand or forearm are selected for command extraction. For example, if the user's hand is within a certain distance from an entertainment system, a dictionary (e.g., dictionary 320B) associated with the entertainment system is selected for command extraction.

Conversely, if the driver's hand or forearm is away from these devices and is raised above a certain level (i.e., raised above the dashboard) at the time the verbal commands are issued, the command extraction module 316 determines that the verbal commands are associated with the navigation system. Hence, the command extraction module 316 selects and uses a dictionary (e.g., dictionary 320A) associated with the navigation operation to perform speech recognition.

In one embodiment, the verbal command recognized by the command extraction module 316 is combined with gesture information to generate navigation commands at the command format module 244. The gesture information may indicate, for example, the orientation of the driver's finger, as described below in detail with reference to FIG. 4.

The command extraction module 316 may use more than one dictionary to extract the verbal commands. If the hand of the user is located around the center console, dictionaries associated with any devices (e.g., the entertainment system or the climate control system) that can be operated at the center console may be selected.

In one embodiment, the command extraction module 316 assigns probability weights to commands based on the location of the user's hand or forearm. The command extraction module 316 uses a statistical model that computes probabilities of spoken verbal commands based on phonemes appearing in a sequence. The statistical model may include parameters that take into account of the location of the hand or forearm in determining the most likely command intended by the driver.

The speech recognition module 256 of FIG. 3 is merely illustrative. Various modifications can be made to the speech recognition module 256. For example, instead of having multiple dictionaries, the command dictionary 320 may map each of a plurality of commands to one or more devices.

Example Detecting Point-of-Interest Using Gesture and Verbal Command

By using a combination of hand gesture and a voice command, a user can conveniently identify a point-of-interest or destination. While pointing to a point-of-interest or destination, the user can utter a command requesting the navigation system to identify and/or set a point-of-interest. The command format module 244 may combine the commands recognized from speech and parameters extracted from the gesture information to generate a navigation command.

Figure 4:
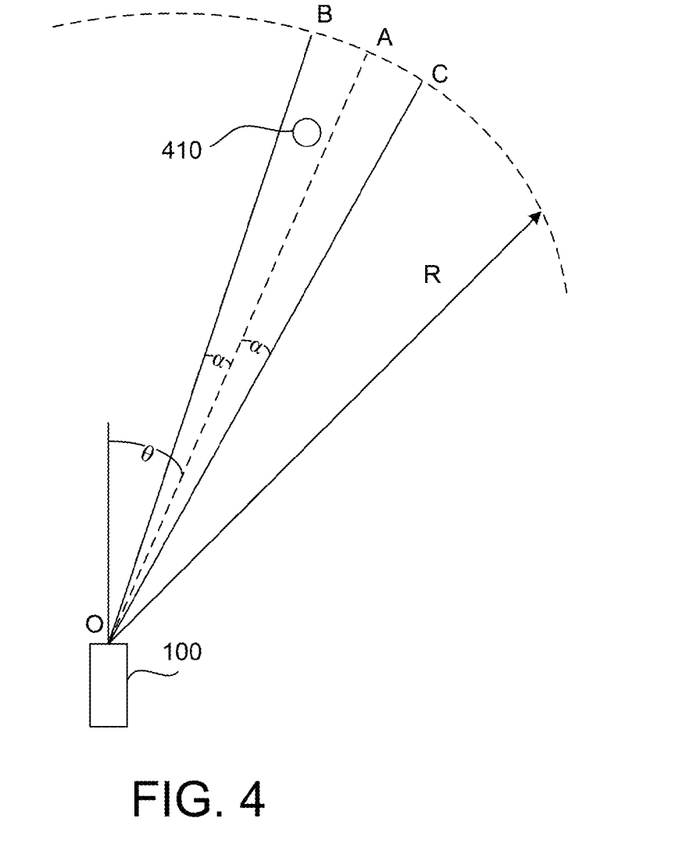
FIG. 4 is a conceptual diagram illustrating a search region for a point-of-interest, according to one embodiment.

FIG. 4 is a conceptual diagram illustrating a search region for a point-of-interest, according to one embodiment. In FIG. 4, the driver wishes to navigate to building 410 or wants to identify the name or address of building 410. The driver states a verbal command "identify that building" while pointing his finger towards the building 410. Due to various inaccuracies, the gesture recognition module 252 may detect that the driver is pointing his finger in direction O-A (shown in a dashed line).

In response, the speech recognition module 256 receives gesture information from the gesture recognition module 252 indicating that the user's arm and forearm is raised. The speech recognition module 256 determines that the verbal command is associated with a navigation system (since the hand and forearm is raised) and uses a dictionary associated with the navigation system to recognize the verbal command. The speech recognition module 256 sends the identified verbal command to the command format module 244.

The command format module 244 receives the verbal command, analyzes the verbal command and determines that the phrase "that building" needs further clarification. The command format module 244 analyzes the gesture information and uses a parameter in the gesture information indicating the orientation (indicated by line O-A) of the user's finger to generates device command requesting the navigation system to identify any points-of-interest in the direction of line O-A. For example, the parameter may be angle θ relative to the front direction of the vehicle 100.

The navigation system receives the device command, and establishes a search cone represented by O-B-C-O. The search cone has a height of R indicating the search radius (e.g., 10 miles) and has a cone angle of 2α. The cone angle 2α may be increased to expand the search or to allow increased tolerance for errors. The navigation system performs the search within the search region identified by the search cone, taking into account vehicle speed and the direction of the vehicle movement. In one embodiment, priority is given to the points of interest that are closer to the vehicle. In one embodiment, the navigation system presents a list of points-of-interest found within the search region to the user. The user may then indicate the point-of-interest from the searched list and request further actions (e.g., navigate to the point-of-interest or make a phone call to the point-of-interest).

Example Method of Recognizing Verbal Commands Based on Gesture Data

Figure 5:
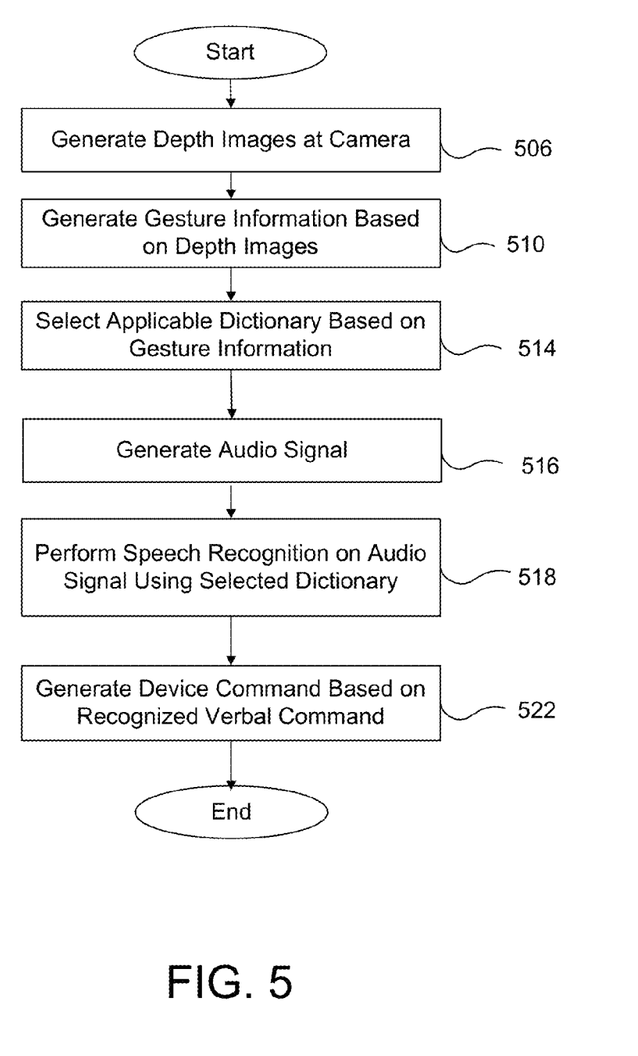
FIG. 5 is a flowchart for a method of performing speech recognition based on depth images captured by a camera, according to one embodiment.

FIG. 5 is a flowchart illustrating a method of recognizing verbal commands based on a driver's motions or gesture, according to one embodiment. The command processing system 200 generates 506 depth images using the depth camera 222. Using the generated depth images, the command processing system 200 generates 510 gesture information of the user. The gesture information may indicate, among other things, the location of hands or forearms of the user relative to the depth camera 222.

Based on the gesture information, the command processing system 200 selects 514 one or more dictionaries for recognizing verbal commands. Each dictionary may include commands for a certain system or device in the vehicle 100.

The command processing system 200 also generates a digital audio signal representing the driver's utterance based on an acoustic signal received at the microphone 260.

After the applicable dictionary or dictionaries are selected, the command processing system 200 performs 518 speech recognition on the generated audio signal using one or more selected dictionaries. By limiting or pruning applicable verbal commands based on the gesture information indicating the user's pose or gesture at the time the verbal commands are spoken, the accuracy of the speech recognition can be increased.

After a verbal command is generated, the command processing system 200 generates 522 a device command corresponding to the verbal command by translating the verbal command into the device command. If needed, the command processing system 200 may add, modify or request information for generating the device command.

The processes and their sequence as illustrated in FIG. 5 are merely illustrative. Various modifications can be made to the processes and/or the sequence. For example, speech recognition may be performed 518 to generate a set of candidate verbal commands. Subsequently, the final verbal command may be selected from the set of candidate verbal commands based on the determination 510 of the driver's gesture. Further, one or more processes may be performed in parallel. For example, generating 506 the depth images at the depth camera 222 may be performed in parallel with generating 516 the audio signal.

ALTERNATIVE EMBODIMENTS

In one or more embodiments, one or more cameras are used to increase the accuracy of gesture detection. The cameras may also capture color images. The color images may detect skin tone that represents the driver's hands. By correlating the color images with depth images, the location of the hand or forearm can be detected more accurately. Further, two or more cameras may be located at different locations of the ceiling or elsewhere in the vehicle 100 to complement or supplant the depth images captured at one depth camera.

In one or more embodiments, one or more components of the command processing system 200 may be embodied by a remote server communicating with the command processing system 200 installed in the vehicle 100. For example, the speech recognition module 256 is embodied in a remote server that communicates wirelessly with the command processing system 200 installed in the vehicle 100.

In one or more embodiments, the command processing system 200 is used in a transport apparatus other than a vehicle. The command processing system 200 can be used, for example, in airplanes or motorcycles.

Although several embodiments are described above, various modifications can be made within the scope of the present disclosure. Accordingly, the disclosure of the present invention is intended to be illustrative, but not limiting, of the scope of the invention, which is set forth in the following claims.

What is claimed is:

1. A computer-implemented method of recognizing verbal commands, comprising:
    capturing at least one depth image by a depth camera positioned in a vehicle, each of the depth image covering at least part of a user and comprising pixels representing distances from the depth camera to the at least part of the user;
    recognizing a pose or gesture of the user based on the captured depth image;
    generating gesture information based on the recognized pose or gesture, the gesture information indicating a direction pointed by the user outward of the vehicle towards a point-of-interest outside the vehicle;
    determining one or more devices among a plurality of devices that are likely to be targeted by the user for an operation by analyzing the gesture information and without performing speech recognition on an audio signal including an utterance by the user;
    selecting a plurality of verbal commands associated with the one or more devices determined as likely being targeted;
    receiving the audio signal including the utterance by the user at a time when the at least one depth image is being captured; and
    determining a device command for operating the one or more devices likely being targeted by performing speech recognition on the audio signal using the selected plurality of verbal commands, the determined device command representing an action associated with the point-of-interest.

2. The method of claim 1, wherein the at least part of the user comprises a hand or a forearm of the user.

3. The method of claim 1, wherein the depth camera is installed in an overhead console in the vehicle, the depth camera overlooking the user.

4. The method of claim 1, wherein the plurality of devices comprise at least a navigation system and an entertainment system in the vehicle.

5. The method of claim 1, wherein the gesture information indicates whether a hand or forearm of the user is located within a distance from the depth camera or beyond the distance from the depth camera, and wherein a first set of verbal commands is selected responsive to the gesture information indicating that the hand or the forearm is located within the distance, and wherein a second set of verbal commands are selected responsive to the gesture information indicating that the hand or the forearm is located beyond the distance.

6. The method of claim 5, wherein the first set of verbal commands is associated with performing navigation operations in the vehicle.

7. The method of claim 6, wherein the first set of verbal commands comprises a command for identifying or setting the point-of-interest for the navigation operations.

8. The method of claim 6, wherein the second set of verbal commands is associated with operating an entertainment system, a climate control system or a diagnostic system.

9. A command processing system for recognizing verbal commands, comprising:
  a depth camera positioned in a vehicle and configured to capture at least one depth image by a depth camera, each of the depth image covering at least part of a user and comprising pixels representing distances from the depth camera to the at least part of the user;
  a gesture recognition module coupled to the depth camera, the gesture recognition module configured to recognize the pose or gesture of the user based on the captured depth image and generate gesture information based on the recognized pose or gesture, the gesture information indicating a direction pointed by the user outward of the vehicle towards a point-of-interest outside the vehicle;
  a command extraction module configured to:
    determine one or more devices among a plurality of devices that are likely to be targeted by the user for an operation by analyzing the gesture information and without performing speech recognition on an audio signal including an utterance by the user;
    select a plurality of verbal commands associated with the one or more devices determined as likely being targeted;
    receive the audio signal including the utterance by the user while the depth camera is capturing the at least one depth image; and
    determine a device command for operating the one or more devices likely being targeted by performing speech recognition on the audio signal using the selected plurality of verbal commands, the determined device command representing an action associated with the point-of-interest.

10. The command processing system of claim 9, wherein the at least part of the user comprises a hand or a forearm of the user.

11. The command processing system of claim 9, wherein the depth camera is installed in an overhead console in the vehicle overlooking the user.

12. The command processing system of claim 11, wherein the depth camera comprises a stereovision camera feeding captured images for processing into the at least one depth image.

13. The command processing system of claim 9, wherein the plurality of devices comprise at least a navigation system and an entertainment system in the vehicle.

14. The command processing system of claim 9, wherein the gesture information indicates whether a hand or forearm of the user is located within a distance from the depth camera or beyond the distance from the depth camera, and wherein the command extraction module selects a first set of verbal commands responsive to the gesture information indicating that the hand or the forearm is located within the distance and selects a second set of verbal commands responsive to the gesture information indicating that the hand or the forearm is located beyond the distance.

15. The command processing system of claim 14, wherein the first set of verbal commands is associated with performing navigation operations in the vehicle.

16. The command processing system of claim 14, wherein the first set of verbal commands comprise a command for identifying or setting the point-of-interest for the navigation operations.

17. The command processing system of claim 16, wherein the second set of verbal commands is associated with operating an entertainment system, a climate control system or a diagnostic system.

18. A non-transitory computer readable storage medium for recognizing verbal commands, the computer readable storage medium structured to store instructions, when executed, cause a processor to:
  capture at least one depth image by a depth camera positioned in a vehicle, each of the depth image covering at least part of a user and comprising pixels representing distances from the depth camera to the at least part of the user;
  recognize a pose or gesture of the user based on the captured depth image;
  generate gesture information based on the recognized pose or gesture, the gesture information indicating a direction pointed by the user outward of the vehicle towards a point-of-interest outside the vehicle;
  determine one or more devices among a plurality of devices that are likely to be targeted by the user for an operation by analyzing the gesture information and without performing speech recognition on an audio signal including an utterance by the user;
  select a plurality of verbal commands associated with the one or more devices determined as likely being targeted;
  receive the audio signal including the utterance by the user while the at least one depth image is being captured; and
  determine a device command for operating the one or more devices likely being targeted by performing speech recognition on the audio signal using the selected plurality of verbal commands, the determined device command representing an action associated with the point-of-interest.

* * * * *

UNITED STATES PATENT AND TRADEMARK OFFICE
CERTIFICATE OF CORRECTION

| | | |
|---|---|---|
| PATENT NO. | : 9,092,394 B2 | Page 1 of 1 |
| APPLICATION NO. | : 13/524351 | |
| DATED | : July 28, 2015 | |
| INVENTOR(S) | : Tarek El Dokor et al. | |

It is certified that error appears in the above-identified patent and that said Letters Patent is hereby corrected as shown below:

Title page, item (73), Assignee:
Applicants kindly request correction of assignee indicated on the cover of the patent from "Honda Motor Co., Ltd., Tokyo (JP)" to -- Honda Motor Co., Ltd., Tokyo (JP) and Edge3 Technologies, LLC, Phoenix (AZ) --.

Signed and Sealed this
Eighth Day of March, 2016

Michelle K. Lee
*Director of the United States Patent and Trademark Office*